(12) United States Patent
Li et al.

(10) Patent No.: US 10,663,855 B2
(45) Date of Patent: May 26, 2020

(54) PHOTOETCHING PARAMETER ADJUSTMENT METHOD AND APPARATUS, AND MASK PLATE

(71) Applicant: BOE Technology Group Co., Ltd., Beijing (CN)

(72) Inventors: Wusheng Li, Beijing (CN); Zhanfeng Cao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 165 days.

(21) Appl. No.: 15/828,804

(22) Filed: Dec. 1, 2017

(65) Prior Publication Data
US 2018/0224738 A1    Aug. 9, 2018

(30) Foreign Application Priority Data
Feb. 9, 2017    (CN) .......................... 2017 1 0071675

(51) Int. Cl.
*G03F 1/44* (2012.01)
*G03F 7/20* (2006.01)
*G06F 119/18* (2020.01)

(52) U.S. Cl.
CPC ................. *G03F 1/44* (2013.01); *G03F 7/20* (2013.01); *G03F 7/70483* (2013.01); *G03F 7/70616* (2013.01); *G06F 2119/18* (2020.01)

(58) Field of Classification Search
CPC .......... G03F 1/44; G03F 7/20; G03F 7/70483; G03F 7/70616

USPC ...................................................... 430/5, 30
See application file for complete search history.

(56) References Cited

FOREIGN PATENT DOCUMENTS

| CN | 101900954 A | 12/2010 |
|---|---|---|
| CN | 102122116 A | 7/2011 |
| CN | 102376541 A | 3/2012 |
| CN | 103135364 A | 6/2013 |
| CN | 103324025 A | 9/2013 |

OTHER PUBLICATIONS

First office action of Chinese application No. 201710071675.9 dated Jul. 12, 2019.

*Primary Examiner* — Christopher G Young
(74) *Attorney, Agent, or Firm* — Fay Sharpe LLP

(57) ABSTRACT

The present disclosure relates to a photoetching parameter adjustment method, apparatus and mask plate, in the field of photoetching technology. The method comprises: forming a photoresist pattern on a first substrate by a photoetching process, wherein the photoresist pattern comprises a photoetching detection pattern; judging whether photoetching parameters of the photoetching process need to be adjusted or not in accordance with the photoetching detection pattern; and adjusting the photoetching parameters when the photoetching parameters need to be adjusted. The present disclosure solves the problem that the reliability of the photoetching parameters is low and improves the reliability of the photoetching parameters. The present disclosure is used for adjusting photoetching parameters.

6 Claims, 7 Drawing Sheets

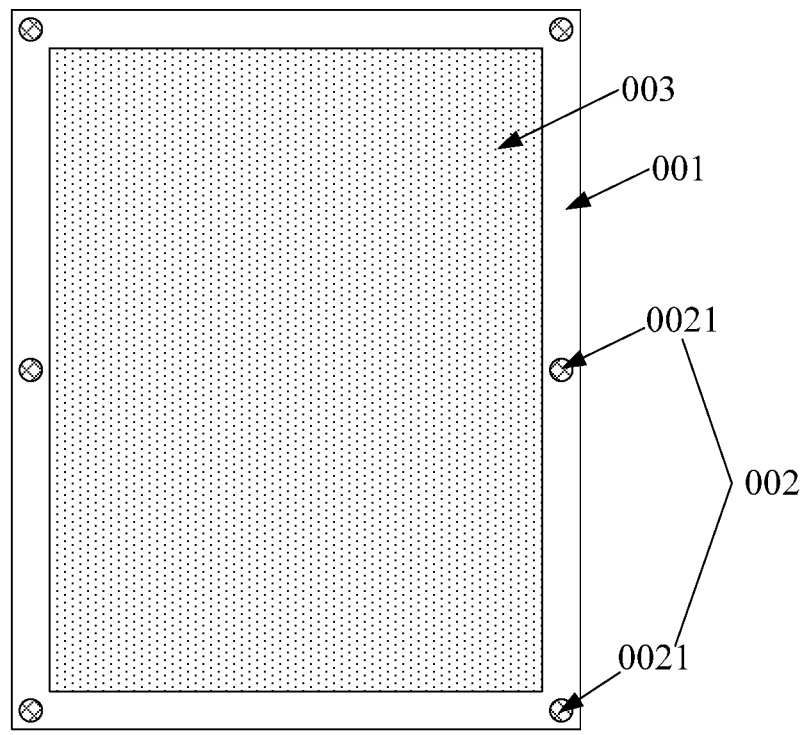

FIG. 1 form a photoresist pattern on a first substrate through a photoetching process, wherein the photoresist pattern comprises a photoetching detection pattern — 201 judge whether photoetching parameters of the photoetching process need to be adjusted or not in accordance with the photoetching detection pattern — 202 adjust the photoetching parameters under the condition that the photoetching parameters need to be adjusted — 203

FIG. 2

PHOTOETCHING PARAMETER ADJUSTMENT METHOD AND APPARATUS, AND MASK PLATE

The present application claims priority to the Chinese Patent Application No. 201710071675.9, filed with the State Intellectual Property Office on Feb. 9, 2017, and titled "Photoetching Parameter Adjustment Method and Apparatus, and Mask Plate", which is incorporated herein by reference in its entirety.

TECHNICAL FIELD

The present disclosure relates to the field of photoetching, and more particularly to a photoetching parameter adjustment method and apparatus, and a mask plate.

BACKGROUND

A display apparatus generally includes an array substrate and a color filter substrate which are assembled to form a cell, and a liquid crystal filled between the array substrate and the color filter substrate. A photoetching process is a key process in the preparation of a display substrate (e.g., an array substrate or a color filter substrate), and is capable of transferring the pattern on a mask plate to the display substrate by means of photoetching equipment. The photoetching process generally includes photoresist coating, exposure and development. Correspondingly, the photoetching equipment includes coating equipment, exposure equipment and developing equipment. In order to ensure the uniformity (e.g., the uniformity of the thickness of the coated photoresist, the uniformity of the exposure, etc.) of the pattern formed through the photoetching process, it is generally desirable to adaptively adjust the photoetching parameters of the photoetching process.

In the related art, periodic maintenance (PM) or a verification test may be carried out on the photoetching equipment. During the PM or verification test, the photoetching equipment may be inspected to judge whether the photoetching parameters need to be adjusted or not based on the inspection result, and to further adjust the photoetching parameters based on the judgment result.

During the process of implementing the present disclosure, at least following problem is found in the related art: At present, the adjustment to the photoetching parameters is only performed during the PM or verification test. As the PM or verification test cycle is relatively long, it is difficult to adjust the photoetching parameters in time in accordance with actual requirements. Therefore, the reliability of the photoetching parameters is relatively low.

SUMMARY

The present disclosure provides a photoetching parameter adjustment method and apparatus, and a mask plate, capable of solving the problem that the reliability of the photoetching parameters is relatively low. The technical solutions are as follows:

In a first aspect, there is provided a photoetching parameter adjustment method. The method comprises:

forming a photoresist pattern on a first substrate through a photoetching process, wherein the photoresist pattern comprises a photoetching detection pattern;

judging whether photoetching parameters of the photoetching process need to be adjusted or not in accordance with the photoetching detection pattern; and adjusting the photoetching parameters when the photoetching parameters need to be adjusted.

In some embodiments, the photoetching process comprises a coating process and an exposure process, and the photoetching parameters comprise coating parameters and exposure parameters, and judging whether the photoetching parameters of the photoetching process need to be adjusted or not in accordance with the photoetching detection pattern comprises:

judging whether a thickness distribution of the photoetching detection pattern is uniform or not;

determining that the coating parameters of the coating process need to be adjusted when the thickness distribution of the photoetching detection pattern is non-uniform; and judging whether the exposure parameters of the exposure process need to be adjusted or not in accordance with the photoetching detection pattern when the thickness distribution of the photoetching detection pattern is uniform.

In some embodiments, the photoetching detection pattern comprises: a plurality of detection mark patterns; and judging whether the thickness distribution of the photoetching detection pattern is uniform or not comprises:

determining a thickness of each of the plurality of detection mark patterns;

judging whether the thicknesses of the plurality of detection mark patterns are equal or not;

determining that the thickness distribution of the photoetching detection pattern is uniform when the thicknesses of the plurality of detection mark patterns are equal; and determining that the thickness distribution of the photoetching detection pattern is non-uniform when the thicknesses of at least two of the plurality of detection mark patterns are not equal.

In some embodiments, determining the thickness of each of the plurality of detection mark patterns comprises:

determining the capacitance corresponding to a first detection mark pattern, wherein the first detection pattern is any of the plurality of detection mark patterns; and determining the thickness of the first detection mark pattern in accordance with a thickness determination formula, wherein the thickness determination formula is:

$$d = \varepsilon \frac{S}{C_n}, \quad \frac{1}{C_n} = \frac{1}{C} - \left(\frac{1}{C_1} + \frac{1}{C_2} \cdots \frac{1}{C_{n-1}}\right);$$

wherein, $C_n$ represents the capacitance corresponding to the first detection mark pattern, n represents that the first detection mark pattern is located on an $n^{th}$ layer of the first substrate, S represents an area of a directly opposite portion between a side of the first detection mark pattern close to the first substrate and a side of the first detection mark pattern away from the first substrate, d represents the thickness of the first detection mark pattern; C represents total capacitance of corresponding areas of the first detection mark pattern on n-layer patterns of the first substrate; $C_1$ represents the capacitance of the corresponding area of the first detection mark pattern on a first layer pattern of the first substrate, $C_2$ represents the capacitance of the corresponding area of the first detection mark pattern on a second layer pattern of the first substrate, $C_{n-1}$ represents the capacitance of the corresponding area of the first detection mark pattern on an $(n-1)^{th}$ layer pattern of the first substrate. That is, $C_1$ represents the capacitance corresponding to a first pattern, the first pattern belongs to the first layer pattern of the first substrate and is located within an area formed by an orthographic projection of a profile of the first detection mark pattern on the first layer pattern, $C_2$ represents the capacitance corresponding to a second pattern, the second pattern belongs to a second layer pattern of the first substrate and is located within an area formed by the orthographic projection of the profile of the first detection mark pattern on the second layer pattern, $C_{n-1}$ represents the capacitance corresponding to an $(n-1)^{th}$ pattern, the $(n-1)^{th}$ pattern belongs to an $(n-1)^{th}$ layer pattern of the first substrate and is located within an area formed by the orthographic projection of the profile of the first detection mark pattern on the $(n-1)^{th}$ layer pattern; C represents the capacitance corresponding to a structure formed by superposing the first pattern until to the first detection mark pattern, and ε represents a dielectric constant.

In some embodiments, judging whether the exposure parameters of the exposure process need to be adjusted or not in accordance with the photoetching detection pattern comprises:

acquiring a photoetching image of the photoetching detection pattern;

judging whether the photoetching image matches up with a preset photoetching image or not;

determining that the exposure parameters of the exposure process do not need to be adjusted when the photoetching image matches up with the preset photoetching image; and determining that the exposure parameters of the exposure process need to be adjusted when the photoetching image does not match up with the preset photoetching image.

In some embodiments, the photoresist pattern further comprises a photoetching mask pattern that is located in a display area of the first substrate, and forming the photoresist pattern on the first substrate through the photoetching process comprises:

forming a photoresist layer on the first substrate through a coating process;

exposing the photoresist layer by adopting a first mask plate through an exposure process; and developing the exposed photoresist layer through a developing process to obtain the photoresist pattern;

wherein the first mask plate comprises a mask pattern area and a detection pattern area; the mask pattern area is provided with a mask pattern, and the detection pattern area is provided with a detection pattern; the photoetching mask pattern corresponds to the mask pattern, and the photoetching detection pattern corresponds to the detection pattern.

In some embodiments, the first substrate is provided with a display area and a non-display area, and the photoetching detection pattern is located in the non-display area of the first substrate.

In a second aspect, there is provided a photoetching parameter adjustment apparatus. The apparatus comprises:

a photoetching module configured to form a photoresist pattern on a first substrate through a photoetching process, wherein the photoresist pattern comprises a photoetching detection pattern;

a judgment module configured to judge whether photoetching parameters of the photoetching process need to be adjusted or not in accordance with the photoetching detection pattern; and an adjustment module configured to adjust the photoetching parameters when the photoetching parameters need to be adjusted.

In some embodiments, the photoetching process comprises a coating process and an exposure process, and the photoetching parameters comprise coating parameters and exposure parameters, and the judgment module comprises:

a first judgment sub-module configured to judge whether a thickness distribution of the photoetching detection pattern is uniform or not;

a determination sub-module configured to determine that the coating parameters of the coating process need to be adjusted when the thickness distribution of the photoetching detection pattern is non-uniform; and a second judgment sub-module configured to judge whether the exposure parameters of the exposure process need to be adjusted or not in accordance with the photoetching detection pattern when the thickness distribution of the photoetching detection pattern is uniform.

In some embodiments, the photoetching detection pattern comprises a plurality of detection mark patterns, and the first judgment sub-module comprises:

a first determination unit configured to determine a thickness of each of the plurality of detection mark patterns;

a judgment unit configured to judge whether the thicknesses of the plurality of detection mark patterns are equal or not;

a second determination unit configured to determine that the thickness distribution of the photoetching detection pattern is uniform when the thicknesses of the plurality of detection mark patterns are equal; and a third determination unit configured to determine that the thickness distribution of the photoetching detection pattern is non-uniform when the thicknesses of at least two of the plurality of detection mark patterns are not equal.

In some embodiments, the first determination unit is configured to:

determine the capacitance corresponding to a first detection mark pattern, wherein the first detection pattern is any of the plurality of detection mark patterns; and determine the thickness of the first detection mark pattern in accordance with a thickness determination formula, wherein the thickness determination formula is:

$$d = \varepsilon \frac{S}{C_n}, \frac{1}{C_n} = \frac{1}{C} - \left(\frac{1}{C_1} + \frac{1}{C_2} \cdots \frac{1}{C_{n-1}}\right);$$

wherein, $C_n$ represents the capacitance corresponding to the first detection mark pattern; n represents that the first detection mark pattern is located on an $n^{th}$ layer of the first substrate; S represents an area of a directly opposite portion between a side of the first detection mark pattern close to the first substrate and a side of the first detection mark pattern away from the first substrate; d represents a thickness of the first detection mark pattern; C represents total capacitance of corresponding areas of the first detection mark pattern on n-layer patterns of the first substrate; $C_1$ represents the capacitance of the corresponding area of the first detection mark pattern on a first layer pattern of the first substrate, $C_2$ represents the capacitance of the corresponding area of the first detection mark pattern on a second layer pattern of the first substrate, $C_{n-1}$ represents the capacitance of the corresponding area of the first detection mark pattern on an $(n-1)^{th}$ layer pattern of the first substrate. That is, $C_1$ represents the capacitance corresponding to a first pattern, the first pattern belongs to the first layer pattern of the first substrate and is located within an area formed by an orthographic projection of a profile of the first detection mark pattern on the first layer pattern, $C_2$ represents the capacitance corresponding to a second pattern, the second pattern belongs to a second layer pattern of the first substrate and is located within an area formed by the orthographic projection of the profile of the first detection mark pattern on the second layer pattern, $C_{n-1}$ represents the capacitance corresponding to an $(n-1)^{th}$ pattern, the $(n-1)^{th}$ pattern belongs to an $(n-1)^{th}$ layer pattern of the first substrate and is located within an area formed by the orthographic projection of the profile of the first detection mark pattern on the $(n-1)^{th}$ layer pattern; C represents the capacitance corresponding to a structure formed by superposing the first pattern until to the first detection mark pattern, and ε represents a dielectric constant.

In some embodiments, the second judgment sub-module is configured to:

acquire a photoetching image of the photoetching detection pattern;

judge whether the photoetching image matches up with a present photoetching image or not;

determine that the exposure parameters of the exposure process do not need to be adjusted when the photoetching image matches up with the preset photoetching image; and determine that the exposure parameters of the exposure process need to be adjusted when the photoetching image does not match up with the preset photoetching image.

In some embodiments, the photoresist pattern further includes a photoetching mask pattern that is located in the display area of the first substrate, and the photoetching module is configured to:

form a photoresist layer on the first substrate through a coating process;

expose the photoresist layer by adopting a first mask plate through an exposure process; and develop the exposed photoresist layer through a developing process to obtain the photoresist pattern;

wherein the first mask plate comprises a mask pattern area and a detection pattern area. The mask pattern area is provided with a mask pattern, and the detection pattern area is provided with a detection pattern. The photoetching mask pattern corresponds to the mask pattern, and the photoetching detection pattern corresponds to the detection pattern.

In some embodiments, the first substrate is provided with a display area and a non-display area, and the photoetching detection pattern is located in the non-display area of the first substrate.

In a third aspect, there is provided a mask plate. The mask plate comprises: a detection pattern area. The detection pattern area is provided with a detection pattern, and the detection pattern is used for forming a photoetching detection pattern on a first substrate.

In some embodiments, the first substrate is provided with a display area and a non-display area, and the detection pattern is used for forming a photoetching detection pattern in the non-display area of the first substrate.

In some embodiments, the mask plate further comprises: a mask pattern area. The detection pattern area is located outside the mask pattern area, and the mask pattern area is provided with a mask pattern.

In some embodiments, the detection pattern comprises a plurality of detection mark patterns, and the plurality of detection mark patterns are uniformly distributed in the detection pattern area.

In some embodiments, a plate surface of the mask plate and the mask pattern area are of rectangular structures, the detection pattern area is of an annular structure, and an inner ring and an outer ring of the detection pattern area are rectangular. The detection pattern area is located around of the mask pattern area, and the structure of the inner ring of the detection pattern area is identical with the structure of the mask pattern area.

In some embodiments, the plurality of detection mark patterns include six detection mark patterns, four of which are distributed at positions in the detection pattern area corresponding to four corners of the mask pattern area, and the other two of which are distributed at positions in the detection pattern area corresponding to midpoints of two long sides of the mask pattern area.

The technical solutions provided by the present disclosure may bring the following advantageous benefits:

With the photoetching parameter adjustment method and apparatus, and the mask plate provided by the present disclosure, whether the photoetching parameters need to be adjusted or not may be judged in accordance with the photoetching detection pattern in the process of preparation of the substrate and the photoetching parameters may be adjusted in accordance with the judgment result. Therefore, the photoetching parameters may be adjusted in time, thereby solving the problem that the reliability of the photoetching parameters since it is difficult to adjust the photoetching parameters in time in accordance with actual requirements in the related art, and improving the reliability of the photoetching parameters.

It is to be understood that both the foregoing general description and the following detailed description are exemplary and explanatory only and are not intended to limit the present disclosure.

BRIEF DESCRIPTION OF THE DRAWINGS

To describe the technical solutions in the embodiments of the present disclosure more clearly, the following briefly introduces the accompanying drawings that illustrate aspects of the various embodiments. The accompanying drawings in the following description show some embodiments of the present disclosure, and a person of ordinary skill in the art may derive other drawings from these accompanying drawings.

FIG. 1 is a structural schematic diagram of a mask plate provided in an embodiment of the present disclosure;

FIG. 2 is a flow chart of a photoetching parameter adjustment method provided in an embodiment of the present disclosure;

Figure 3:
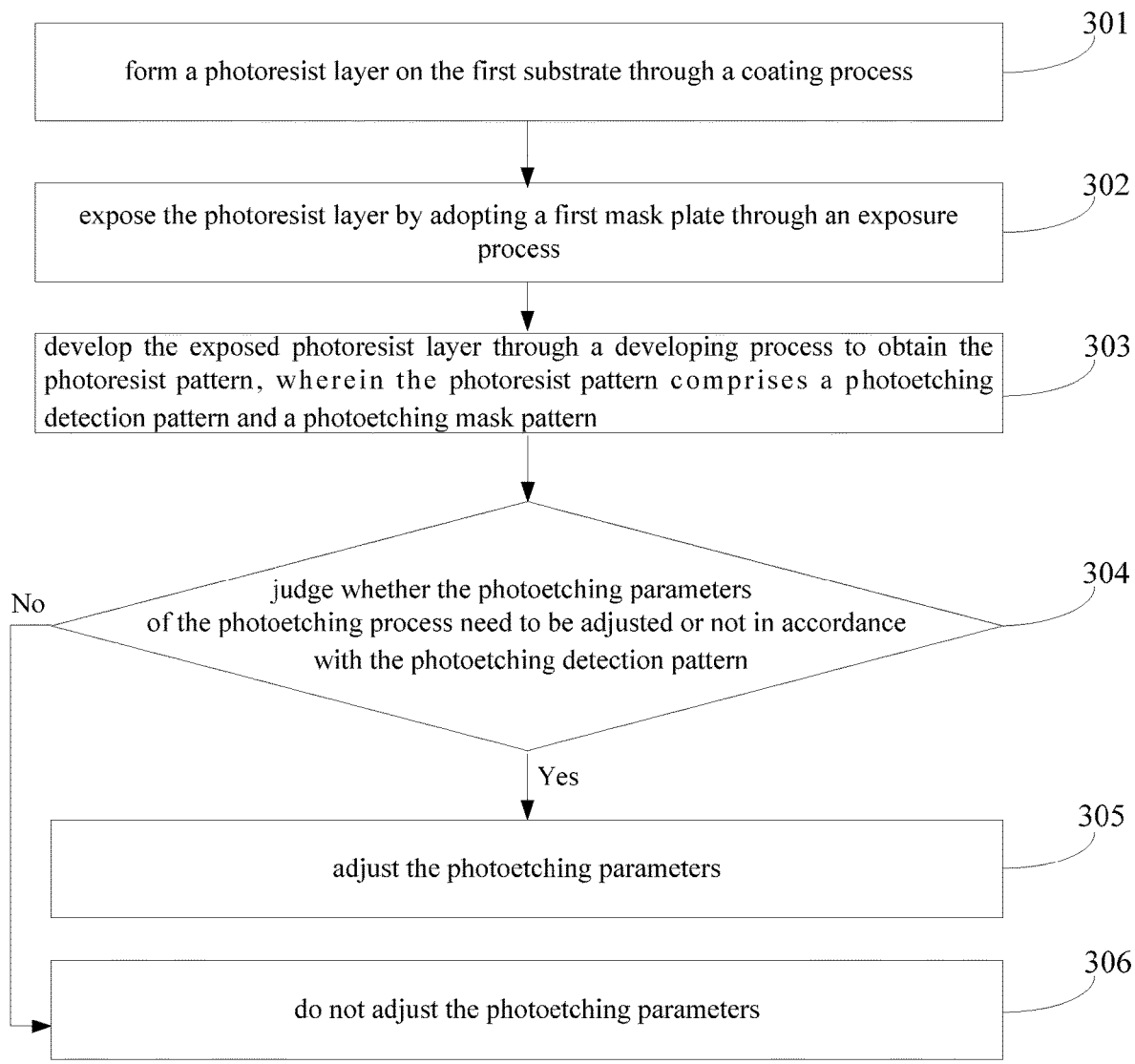
FIG. 3 is a flow chart of another photoetching parameter adjustment method provided in an embodiment of the present disclosure.

The drawings herein are incorporated in and constitute a part of this specification of the present disclosure, showing embodiments consistent with the present disclosure, and explaining the principles of the present disclosure together with the specification.

DETAILED DESCRIPTION OF THE EMBODIMENTS

The present disclosure will be described in further detail with reference to the enclosed drawings, to clearly present the objects, technique solutions, and advantages of the present disclosure.

FIG. 1 illustrates a schematic structural diagram of a mask plate 00 provided in an embodiment of the present disclosure. Referring to FIG. 1, the mask plate 00 comprises: a detection pattern area 001. The detection pattern 001 is provided with a detection pattern 002, and the detection pattern 002 is used for forming a photoetching detection pattern (not shown in FIG. 1) on a first substrate (not shown in FIG. 1). The first substrate may be a basal substrate, or a substrate in which a certain film layer or pattern is formed.

The first substrate is provided with a display area and a non-display area. The non-display area of the first substrate may be an annular area (generally, a square annular area) on the surface of the first substrate close to the edge thereof. The non-display area encloses the display area. The display area is also referred to as an active area (AA). The non-display area is an area outside the display area of the first substrate.

In some embodiments, the detection pattern 002 is used for forming a photoetching detection pattern in the non-display area of the first substrate. As shown in FIG. 1, the detection pattern 002 comprises a plurality of detection mark patterns 0021 which are uniformly distributed in the detection pattern area 001.

In some embodiments, the mask plate 00 further comprises: a mask pattern area 003. The detection pattern area 001 is located outside the mask pattern area 003, and the mask pattern area 003 is provided with a mask pattern (not shown in FIG. 1).

In some embodiments, as shown in FIG. 1, a plate surface of the mask plate 00 and the mask pattern area 003 are of rectangular structures. The detection pattern area 001 is of an annular structure, and an inner ring and an outer ring of the detection pattern area 001 are rectangular. The detection pattern area 001 is located around the mask pattern area, and the structure of the inner ring of the detection pattern area 001 is identical with the structure of the mask pattern area 003. Exemplarily, the plurality of detection mark patterns 0021 include six detection mark patterns, four of which are distributed at positions in the detection pattern area 001 corresponding to four corners of the mask pattern area 003, and the other two of which are distributed at positions in the detection pattern area 001 corresponding to midpoints of two long sides of the mask pattern area 003.

In the embodiments of the present disclosure, the mask plate 00 may include a mask plate body. The mask plate body may be a rectangular plate without any pattern, i.e., the mask plate body is a rectangular plate in which no pattern is formed. The mask plate 00 may be obtained by treating the mask plate body through two-patterning process. Exemplarily, the plate surface of the mask plate body may be divided into a mask pattern area and a detection pattern area. In the first patterning process, a mask pattern may be formed in the mask pattern area. In the second patterning process, a detection pattern may be formed in the detection pattern area, to obtain the mask plate 00. Here, each patterning process may comprise: photoresist coating, exposure, development, etching and photoresist stripping. Therefore, in the first patterning process, the plate surface of the mask plate body may be first coated with a layer of photoresist having a certain thickness to obtain a photoresist layer. The photoresist layer is exposed by adopting the mask plate having the corresponding mask pattern, such that a completely exposed area and a non-exposed area are formed on the photoresist layer. The completely exposed area corresponds to the opening area of the mask pattern which is to be formed in the mask pattern area, and the non-exposed area corresponds to the area outside the opening area of the mask pattern which is to be formed in the mask pattern area and to the detection pattern area. Then, the exposed photoresist layer is treated through a developing process, such that the photoresist in the completely exposed area is removed completely, and the photoresist in the non-exposed area is retained completely. The area on the mask plate body corresponding to the completely exposed area is etched through an etching process to obtain the opening area of the mask pattern which is to be formed in the mask pattern area. After this, the photoresist in the non-exposed area is stripped to form the mask pattern in the mask pattern area. In the second patterning process, the plate surface of the mask plate body in which the mask pattern is formed is first coated with a layer of photoresist having a certain thickness to obtain a photoresist layer. The photoresist layer is exposed by adopting the mask plate having the corresponding detection pattern, such that a completely exposed area and a non-exposed area are formed on the photoresist layer. The completely exposed area corresponds to the opening area of the detection pattern which is to be formed in the detection pattern area, and the non-exposed area corresponds to the area outside the opening area of the detection pattern which is to be formed in the detection pattern area and to the mask pattern area. Then, the exposed photoresist layer is treated through a developing process, such that the photoresist in the completely exposed area is removed completely, and the photoresist in the non-exposed area is retained completely. The area on the mask plate body corresponding to the completely exposed area is etched through an etching process to obtain the opening area of the detection pattern which is to be formed in the detection pattern area. After this, the photoresist in the non-exposed area is stripped to form the detection pattern in the detection pattern area. The mask plate 00 may be obtained after the mask pattern and the detection pattern are formed.

It should be noted that the solution for manufacturing the mask plate 00 described in the embodiment of the present disclosure is illustrated by taking a process of forming the mask pattern first and then forming the detection pattern as an example. In practice, it is also applicable to form the detection pattern first and then form the mask pattern. The sequence of forming the mask pattern and the detection pattern is not limited by the embodiment of the present disclosure. Additionally, the embodiment of the present disclosure is described by taking the process of forming the mask plate 00 by adopting positive photoresist as an example. In practice, it is also applicable to form the mask plate 00 by adopting negative photoresist, which will not be limited by the embodiment of the present disclosure.

In summary, the mask plate provided in the embodiment of the present disclosure comprises a detection pattern. Therefore, the photoetching detection pattern may be formed by adopting the mask plate in the process of manufacturing the substrate, such that whether the photoetching parameters need to be adjusted or not may be judged in accordance with the photoetching detection pattern and the photoetching parameters may be adjusted in accordance with the judgment result in the process of manufacturing the substrate. In this way, the photoetching parameters may be adjusted in time, thereby solving the problem that the reliability of the photoetching parameters is low since it is difficult to adjust the photoetching parameters in time in accordance with actual requirements in the related art, and improving the reliability of the photoetching parameters.

FIG. 2 illustrates a flow chart of a photoetching parameter adjustment method provided in an embodiment of the present disclosure. The photoetching parameter adjustment method is used for adjusting photoetching parameters of a photoetching process and may be implemented by a photoetching parameter adjustment apparatus. Referring to FIG. 2, the method comprises:

At step 201, forming a photoresist pattern on a first substrate by the photoetching process, wherein the photoresist pattern comprises a photoetching detection pattern;

At step 202, judging whether the photoetching parameters of the photoetching process need to be adjusted or not in accordance with the photoetching detection pattern; and At step 203, adjusting the photoetching parameters when the photoetching parameters need to be adjusted.

In summary, with the photoetching parameter adjustment method provided in the embodiment of the present disclosure, whether the photoetching parameters need to be adjusted or not may be judged in accordance with the photoetching detection pattern in the process of manufacturing the substrate, and the photoetching parameters are adjusted in accordance with the judgment result. Therefore, the photoetching parameters may be adjusted in time, thereby solving the problem that the reliability of photoetching parameters is low since it is difficult to adjust the photoetching parameters in time in accordance with actual requirements in the related art, and improving the reliability of the photoetching parameters.

In some embodiments, the photoetching process comprises a coating process and an exposure process, the photoetching parameters comprise coating parameters and exposure parameters, and judging whether the photoetching parameters of the photoetching process need to be adjusted or not in accordance with the photoetching detection pattern comprises:

judging whether a thickness distribution of the photoetching detection pattern is uniform or not;

determining that the coating parameters of the coating process need to be adjusted when the thickness distribution of the photoetching detection pattern is non-uniform; and judging whether the exposure parameters of the exposure process need to be adjusted or not in accordance with the photoetching detection pattern when the thickness distribution of the photoetching detection pattern is uniform.

In some embodiments, the photoetching detection pattern comprises a plurality of detection mark patterns, and judging whether the thickness distribution of the photoetching detection pattern is uniform or not comprises:

determining a thickness of each of the plurality of detection mark patterns;

judging whether the thicknesses of the plurality of detection mark patterns are equal or not;

determining that the thickness distribution of the photoetching detection pattern is uniform when the thicknesses of the plurality of detection mark patterns are equal; and determining that the thickness distribution of the photoetching detection pattern is non-uniform when the thicknesses of at least two of the plurality of detection mark patterns are not equal.

In some embodiments, determining the thickness of each of the plurality of detection mark patterns comprises:

determining the capacitance corresponding to a first detection mark pattern, wherein the first detection mark pattern is any of the plurality of detection mark patterns; and determining the thickness of the first detection mark pattern in accordance with a thickness determination formula, wherein the thickness determination formula is:

$$d = \varepsilon \frac{S}{C_n}, \frac{1}{C_n} = \frac{1}{C} - \left( \frac{1}{C_1} + \frac{1}{C_2} \cdots \frac{1}{C_{n-1}} \right);$$

wherein, $C_n$ represents the capacitance corresponding to the first detection mark pattern; n represents that the first detection mark pattern is located on an $n^{th}$ layer of the first substrate; S represents an area of a right opposite portion between a side of the first detection mark pattern close to the first substrate and a side of the first detection mark pattern away from the first substrate; d represents the thickness of the first detection mark pattern; C represents the total capacitance of corresponding areas of the first detection mark pattern on the n-layer patterns of the first substrate; $C_1$ represents the capacitance of the corresponding area of the first detection mark pattern on a first layer pattern of the first substrate, $C_2$ represents the capacitance of the corresponding area of the first detection mark pattern on a second layer pattern of the first substrate, $C_{n-1}$ represents the capacitance of the corresponding area of the first detection mark pattern on an $(n-1)^{th}$ layer pattern of the first substrate. That is, $C_1$ represents the capacitance corresponding to a first pattern, the first pattern belongs to the first layer pattern of the first substrate and is located within the area formed by an orthographic projection of a profile of the first detection mark pattern on the first layer pattern, $C_2$ represents the capacitance corresponding to a second pattern, the second pattern belongs to a second layer pattern of the first substrate and is located within the area formed by the orthographic projection of the profile of the first detection mark pattern on the second layer pattern, $C_{n-1}$ represents the capacitance corresponding to an $(n-1)^{th}$ pattern, the $(n-1)^{th}$ pattern belongs to an $(n-1)^{th}$ layer pattern of the first substrate and is located within the area formed by the orthographic projection of the profile of the first detection mark pattern on the $(n-1)^{th}$ layer pattern; C represents the capacitance corresponding to a structure formed by superposing the first pattern until to the first detection mark pattern, and $\varepsilon$ represents a dielectric constant.

In some embodiments, judging whether the exposure parameters of the exposure process need to be adjusted or not in accordance with the photoetching detection pattern comprises:

acquiring a photoetching image of the photoetching detection pattern;

judging whether the photoetching image matches up with a preset photoetching image or not, wherein the preset photoetching image may be an ideal photoetching image designed in advance; and determining that the exposure parameters of the exposure process do not need to be adjusted when the photoetching image matches up with the preset photoetching image. In the embodiment of the present disclosure, the match between the photoetching image and the preset photoetching image means that: the shape and the size of the photoetching image are identical with those of the preset photoetching image. In practice, considering the errors in the manufacturing process, the match between the photoetching image and the preset photoetching image may also be that: the difference between the shape of the photoetching image and the shape the preset photoetching image is within a preset difference range, and the difference between the sizes thereof is also within a preset size difference range; and determining that the exposure parameters of the exposure process need to be adjusted when the photoetching image does not match up with the preset photoetching image.

In some embodiments, the photoresist pattern further comprises a photoetching mask pattern which is located in a display area of the first substrate, and forming the photoresist pattern on the first substrate through a photoetching process comprises:

forming a photoresist layer on the first substrate through a coating process;

exposing the photoresist layer by adopting a first mask plate through an exposure process; and developing the exposed photoresist layer through a developing process to obtain the photoresist pattern;

wherein, the first mask plate comprises: a mask pattern area and a detection pattern area. The mask pattern area is provided with a mask pattern, and the detection pattern area is provided with a detection pattern. The photoetching mask pattern corresponds to the mask pattern, and the photoetching detection pattern corresponds to the detection pattern.

In some embodiments, the first substrate is provided with a display area and a non-display area, and the photoetching detection pattern is located in the non-display area of the first substrate.

All of the selectable technique solutions described above may be selected in any combination to form alternative embodiments of the present disclosure, and will not be described again herein.

In summary, with the photoetching parameter adjustment method provided in the embodiment of the present disclosure, whether the photoetching parameters need to be adjusted or not may be judged in accordance with the photoetching detection pattern in the process of manufacturing the substrate, and the photoetching parameters are adjusted in accordance with the judgment result. Therefore, the photoetching parameters may be adjusted in time, thereby solving the problem that the reliability of photoetching parameters is low since it is difficult to adjust the photoetching parameters in time in accordance with actual requirements in the related art, and improving the reliability of the photoetching parameters.

FIG. 3 illustrates a flow chart of another photoetching parameter adjustment method provided in an embodiment of the present disclosure. The photoetching parameter adjustment method is used for adjusting photoetching parameters of a photoetching process and may be implemented by a photoetching parameter adjustment apparatus. Referring to FIG. 3, the method comprises:

At step 301, a photoresist layer is formed on a first substrate by a coating process. Then, step 302 is executed.

Here, the first substrate may be a basal substrate, or a substrate in which a certain film layer or pattern is formed. The basal substrate may be a transparent substrate, or a substrate made of a light-guiding non-metallic material with certain robustness, such as glass, quartz or transparent resin. In some embodiments, the first substrate may be coated with a layer of photoresist having a certain thickness by adopting coating equipment to form a photoresist layer. The process of forming the photoresist layer on the first substrate through the coating process may be referenced to the related art, and will not be repeated in the embodiment of the present disclosure.

At step 302, the photoresist layer is exposed by adopting a first mask plate through an exposure process. Then, step 303 is executed.

Here, the first mask plate may be the mask plate 00 as shown in FIG. 1. The mask plate 00 comprises: a mask pattern area 003 and a detection pattern area 001. The mask pattern area 003 is provided with a mask pattern (not shown in FIG. 1), and the detection pattern area 001 is provided with a detection pattern 002. In addition, the detection pattern 002 may include a plurality of detection mark patterns 0021 which are uniformly distributed in the detection pattern area 001. Here, for the description of the first mask plate, the related description of FIG. 1 may be used as references, and will not be repeated herein.

Figure 4:
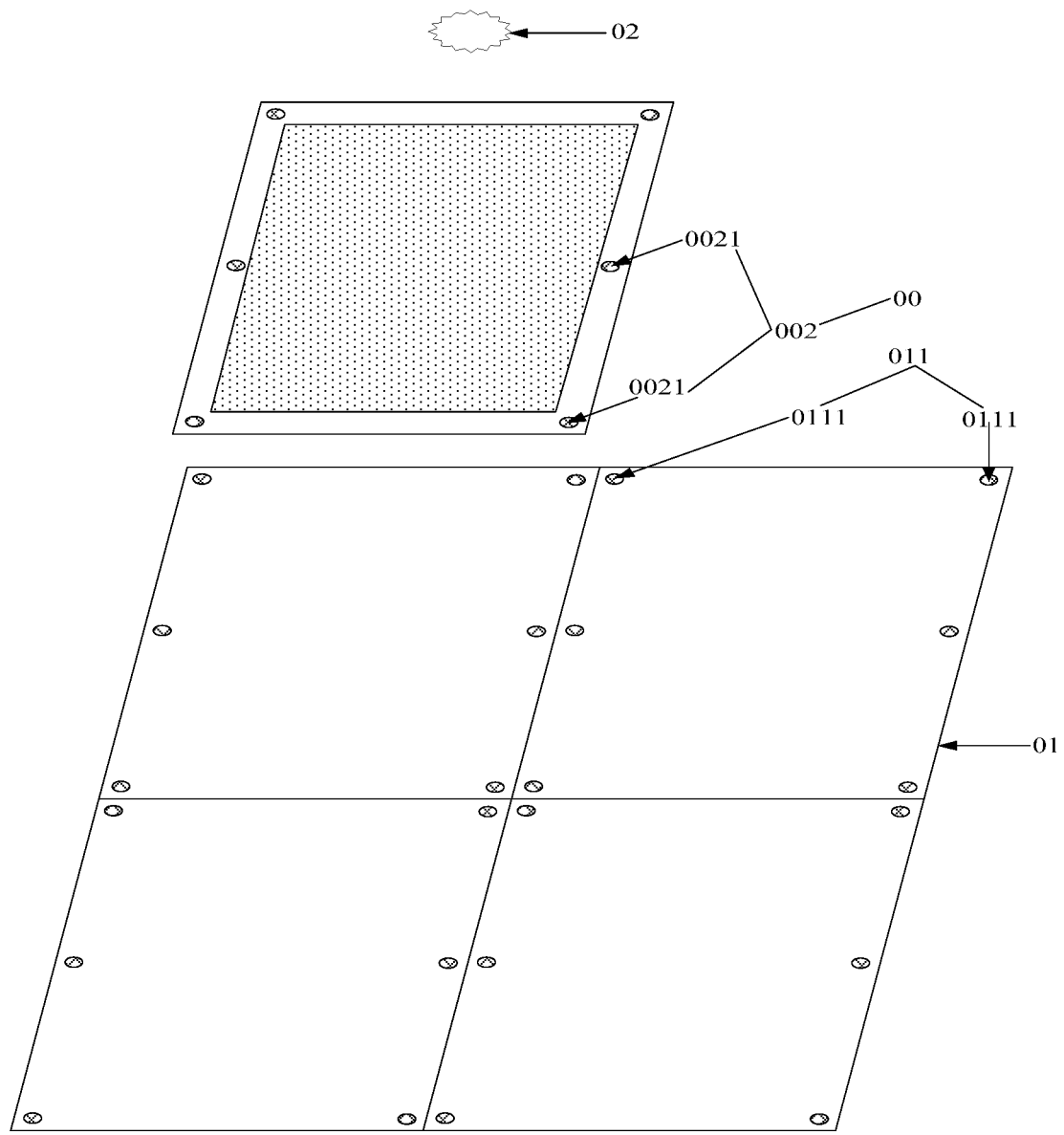
FIG. 4 is a schematic diagram of exposing a photoresist layer by adopting a first mask plate provided in an embodiment of the present disclosure.

Main equipment adopted in the exposure process is an exposure machine. The exposure machine is commonly used in the process of preparing a display substrate (for example, an array substrate and a color filter substrate) and is capable of transferring the pattern on the mask plate to the display substrate by means of exposure. In the embodiment of the present disclosure, the photoresist layer may be exposed by adopting a first mask plate (the mask plate 00) through the exposure process. In the actual implementation, as shown in FIG. 4, the mask plate 00 may be fixed on the exposure machine (not shown in FIG. 4), the first substrate 01 in which the photoresist layer is formed may be disposed below the mask plate 00, and the first substrate 01 is precisely aligned to the mask plate 00. A light source 2 may be disposed above the mask plate 00 and then the photoresist layer may be exposed. Here, as shown in FIG. 4, the area of the first substrate 01 is larger than that of the plate surface of the mask plate 00, and the orthographic projection of the mask plate 00 on the plate surface of the first substrate 01 is located within the plate surface of the first substrate 01. Therefore, the photoresist layer may be exposed in an orientation as shown in FIG. 4 within a first exposure shot. The first substrate 01 may be moved within a second exposure shot to make the mask plate 00 be located above another area of the first substrate 01 such that another area of the photoresist layer may be exposed. The first substrate 01 may be moved again within a third exposure shot and a further area of the photoresist layer may be exposed, until all of the areas of the photoresist layer are exposed. As shown in FIG. 4, all of the areas of the photoresist layer may be exposed by four times of exposure within four exposure shots. The process of exposure may be referenced to the related art and will not be repeated in the embodiment of the present disclosure.

At step 303, the exposed photoresist layer is developed through a developing process to obtain a photoresist pattern.

The photoresist pattern comprises a photoetching detection pattern and a photoetching mask pattern. Then, step 304 is executed.

After the photoresist layer is exposed, the exposed photoresist layer may be developed through the developing process. For example, the exposed photoresist layer may be developed by adopting a developing solution. The process of developing may be referenced to the related art. The photoresist pattern may be obtained after the exposed photoresist layer is developed. The photoresist pattern may include a photoetching detection pattern and a photoetching mask pattern. The photoetching detection pattern is located in the non-display area of the first substrate, and the photoetching mask pattern is located in the display area of the first substrate. Exemplarily, the photoetching pattern is described in the embodiment of the present disclosure by means of the schematic diagram of the exposure as shown in FIG. 4. Referring to FIG. 4, the photoresist pattern maybe obtained after the exposed photoresist layer is developed. The photoresist pattern may include a photoetching detection pattern 011 and a photoetching mask pattern (not shown in FIG. 4). The photoetching mask pattern may be corresponding to the mask pattern on the mask plate 00, and the photoetching detection pattern 011 may be corresponding to the detection pattern 002 on the mask plate 00. In addition, the photoetching detection pattern 011 may include a plurality of detection mark patterns 0111. Exemplarily, as shown in FIG. 4, the photoetching detection pattern 011 includes twenty-four detection mark patterns 0111 which include every six detection patterns corresponding to each exposure shot.

At step 304, whether the photoetching parameters of the photoetching process need to be adjusted or not is judged in accordance with the photoetching detection pattern. Step 305 is executed if the photoetching parameters of the photoetching process need to be adjusted. Step 306 is executed if the photoetching parameters of the photoetching process do not need to be adjusted.

Figure 5:
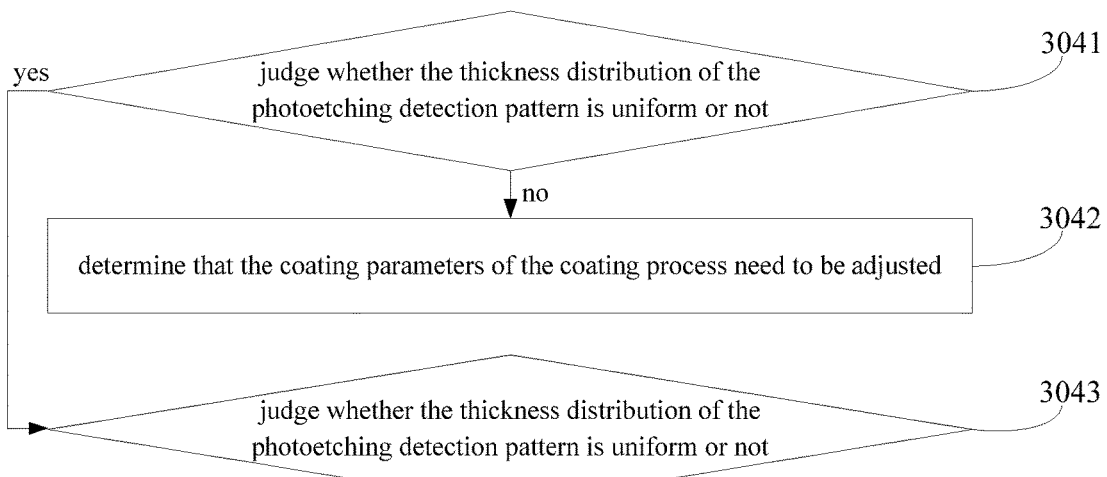
FIG. 5 is a flow chart of a method for judging whether photoetching parameters need to be adjusted or not provided in an embodiment of the present disclosure.

In the embodiment of the present disclosure, the photoetching process may include a coating process and an exposure process. Correspondingly, the photoetching parameters may include coating parameters and exposure parameters. Here, the coating parameters may, for example, refer to a coating thickness, and the exposure parameters may, for example, refer to an exposure focus, an exposure amount, an exposure speed and the like. Exemplarily, FIG. 5 illustrates a flow chart of a method for judging whether the photoetching parameters need to be adjusted or not in accordance with the photoetching detection pattern provided in an embodiment of the present disclosure. Referring to FIG. 5, the method comprises:

At sub-step 3041, whether the thickness distribution of the photoetching detection pattern is uniform or not is judged. Sub-step 3042 is executed if the thickness distribution of the photoetching detection pattern is non-uniform. Sub-step 3043 is executed if the thickness distribution of the photoetching detection pattern is uniform.

Figure 6:
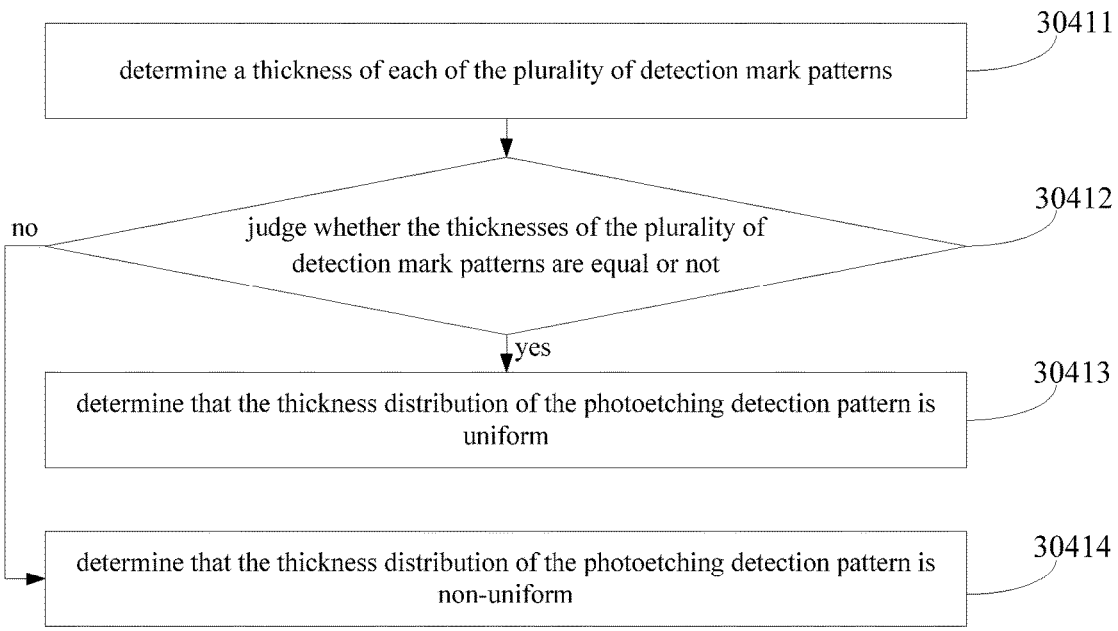
FIG. 6 is a flow chart of a method for judging whether a thickness distribution of a photoetching detection pattern is uniform or not provided in an embodiment of the present disclosure.

In the embodiment of the present disclosure, the photoetching detection pattern includes a plurality of detection mark patterns. Therefore, whether the thickness distribution of the photoetching detection pattern is uniform or not may be judged in accordance with the plurality of detection mark patterns. Exemplarily, referring to FIG. 6, which illustrates a flow chart of a method for judging whether the thickness distribution of the photoetching detection pattern is uniform or not provided in an embodiment of the present disclosure. Referring to FIG. 6, the method comprises:

At sub-step 30411, the thickness of each of the plurality of detection mark patterns is determined. Then, sub-step 30412 is executed.

Figure 7:
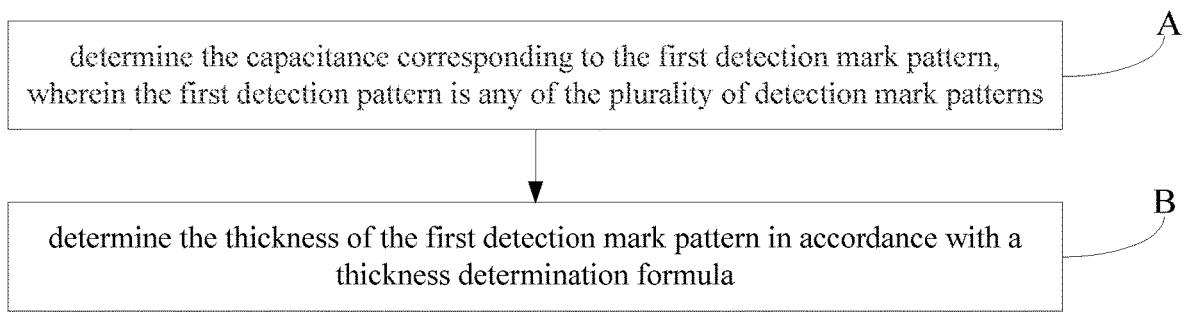
FIG. 7 is a flow chart of a method for determining a thickness of a detection mark pattern provided in an embodiment of the present disclosure.

Exemplarily, referring to FIG. 7, which illustrates a flow chart of a method for determining the thickness of each detection mark pattern provided in an embodiment of the present disclosure. Referring to FIG. 7, the method comprises:

At sub-step A, the capacitance corresponding to the first detection mark pattern is determined. The first detection pattern is any of the plurality of detection mark patterns. Then, sub-step B is executed.

The photoetching parameter adjustment apparatus may determine the capacitance corresponding to the first detection mark pattern. The first detection pattern is any of the plurality of detection mark patterns. For example, the first detection mark pattern is any of the twenty-four detection mark patterns 0111 as shown in FIG. 4.

In some embodiments, the photoetching parameter adjustment apparatus may measure the capacitance corresponding to the first detection mark pattern by adopting a contact method or a non-contact method. When the capacitance corresponding to the first detection mark pattern is measured by adopting the contact method, electrodes may be arranged at two sides of the first detection mark pattern, then voltage is applied to the two electrodes and the voltage difference between the two electrodes is determined. The corresponding capacitance is calculated in accordance with the voltage difference. The implementation process of measuring the capacitance corresponding to the first detection mark pattern by adopting the contact method or the non-contact method may be referenced to the related art, and will not be repeated herein.

At sub-step B, the thickness of the first detection mark pattern is determined in accordance with a thickness determination formula.

After the capacitance corresponding to the first detection mark pattern is determined by the photoetching parameter adjustment apparatus, the thickness of the first detection mark pattern may be determined in accordance with the thickness determination formula. The thickness of the first detection mark pattern is the same as the thickness of the photoresist corresponding to the first detection mark pattern. In the embodiment of the present disclosure, the thickness determination formula may be:

$$d = \varepsilon \frac{S}{C_n}, \frac{1}{C_n} = \frac{1}{C} - \left(\frac{1}{C_1} + \frac{1}{C_2} \cdots \frac{1}{C_{n-1}}\right),$$

wherein $C_n$ represents the capacitance corresponding to the first detection mark pattern; n represents that the first detection mark pattern is located on an $n^{th}$ layer of the first substrate; S represents an area of a directly opposite portion between a side of the first detection mark pattern close to the first substrate and a side of the first detection mark pattern away from the first substrate; d represents the thickness of the first detection mark pattern; C represents the total capacitance of corresponding areas of the first detection mark pattern on n-layer patterns of the first substrate; $C_1$ represents the capacitance of the corresponding area of the first detection mark pattern on a first layer pattern of the first substrate, $C_2$ represents the capacitance of the corresponding area of the first detection mark pattern on a second layer pattern of the first substrate, $C_{n-1}$ represents the capacitance of the corresponding area of the first detection mark pattern on an $(n-1)^{th}$ layer pattern of the first substrate. That is, $C_1$ represents the capacitance corresponding to a first pattern, the first pattern belongs to the first layer pattern of the first substrate and is located within the area formed by an orthographic projection of a profile of the first detection mark pattern on the first layer pattern; $C_2$ represents the capacitance corresponding to a second pattern, the second pattern belongs to a second layer pattern of the first substrate and is located within the area formed by the orthographic projection of the profile of the first detection mark pattern on the second layer pattern; $C_{n-1}$ represents the capacitance corresponding to an $(n-1)^{th}$ pattern, the $(n-1)^{th}$ pattern belongs to an $(n-1)^{th}$ layer pattern of the first substrate and is located within the area formed by the orthographic projection of the profile of the first detection mark pattern on the $(n-1)^{th}$ layer pattern; C represents the capacitance corresponding to a structure formed by superposing the first pattern until to the first detection mark pattern, and ε represents a dielectric constant.

Figure 8:
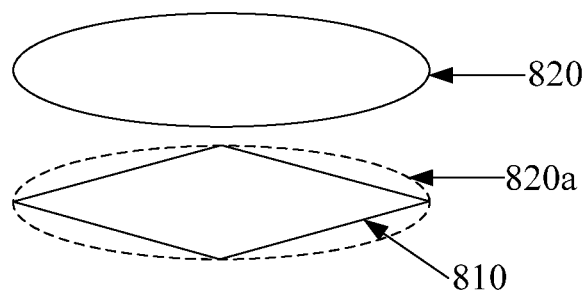
FIG. 8 is a schematic diagram of a positional relationship between a profile of an orthographic projection of a first detection mark pattern on a first layer pattern and a profile of a first pattern provided in an embodiment of the present disclosure.

Exemplarily, referring to FIG. 8, which illustrates a positional relationship between a first detection mark pattern and a first pattern provided in an embodiment of the present disclosure. Referring to FIG. 8, a first pattern 810 belongs to a first layer pattern (not shown in FIG. 8) of the first substrate (not shown in FIG. 8) and is located within an area 820a formed by an orthographic projection of a profile (not shown in FIG. 8) of a first detection mark pattern 820 on the first layer pattern. It should be noted that FIG. 8 is illustrated by taking the positional relationship between the first detection mark pattern and the first pattern as an example. The positional relationship between the first detection mark pattern and a second pattern, and the positional relationship between the first detection mark pattern and an $(n-1)^{th}$ pattern are similar to the one described herein, and will not be repeated in the embodiment of the present disclosure.

Here, the structures of all of the detection mark patterns on the mask plate may be cylinders. S may be equal to the bottom surface area of the detection mark pattern on the mask plate and may be obtained in the process of manufacturing the mask plate. Therefore, S may be a known number at sub-step B. In the process of manufacturing the substrate, the photoetching parameter adjustment apparatus may measure to obtain capacitance $C_1$ of the corresponding area of the first detection mark pattern on the first layer pattern of the first substrate by adopting the contact method or the non-contact method and measure the total capacitance of the corresponding areas of the first detection mark pattern on the first layer pattern and on the second layer pattern of the first substrate by adopting the contact method or the non-contact method, wherein the total capacitance may be represented as $C_1+C_2$. By analogy, the total capacitance of the corresponding areas of the first detection mark pattern on the first layer pattern until to the $(n-1)^{th}$ layer pattern of the first substrate may be measured by adopting the contact method or the non-contact method. The total capacitance may be represented as $C_1+C_2+ \ldots C_{n-1}$. The total capacitance of the corresponding areas of the first detection mark pattern on the first layer pattern until to the $n^{th}$ layer pattern of the first substrate may be measured by adopting the contact method or the non-contact method, wherein the total capacitance may be represented as C. That is, in the process of manufacturing the substrate, the photoetching parameter adjustment apparatus may measure to obtain capacitance $C_1$ corresponding to a first pattern by adopting the contact method or the non-contact method and measure the capacitance corresponding to the structure formed by superposing the first pattern and the second pattern by adopting the contact method or the non-contact method, wherein the capacitance may be represented as $C_1+C_2$. By analogy, the capacitance corresponding to the structure formed by superposing the first pattern until to the $(n-1)^{th}$ pattern may be measured by adopting the contact method or the non-contact method, wherein the capacitance may be represented as $C_1+C_2+ \ldots C_{n-1}$. The capacitance corresponding to the structure formed by superposing the first pattern until to the first detection mark pattern may be measured by adopting the contact method or the non-contact method, wherein the capacitance may be represented as C, and $C=C_1+C_2+ \ldots C_{n-1}+C_n$. Then, the photoetching parameter adjustment apparatus may calculate $C_2$ in the above formula by adopting $$\frac{1}{C_2} = \frac{1}{C_2 + C_1} - \frac{1}{C_1}$$

in accordance with a series capacitance formula. By analogy, $C_{n-1}$ in the above formula is calculated by adopting $$\frac{1}{C_{n-1}} = \frac{1}{C_1 + C_2 + \ldots C_{n-1}} - \left(\frac{1}{C_1} + \frac{1}{C_2} \ldots \frac{1}{C_{n-2}}\right).$$

$C_1, C_2 \ldots C_{n-1}$ and C are substituted into the formula $$\frac{1}{C_n} = \frac{1}{C} - \left(\frac{1}{C_1} + \frac{1}{C_2} \ldots \frac{1}{C_{n-1}}\right)$$

to calculate $C_n$. $C_n$ and S are substituted into the formula $$d = \varepsilon \frac{S}{C_n}$$

to calculate the thickness of the first detection mark pattern.

At sub-step 30412, whether the thicknesses of the plurality of detection mark patterns are equal or not is judged. Sub-step 30413 is executed if the thicknesses of the plurality of detection mark patterns are equal. Sub-step 30414 is executed if the thicknesses of at least two of the plurality of detection mark patterns are not equal.

The photoetching parameter adjustment apparatus may judge whether the thicknesses of the plurality of detection mark patterns are equal or not after determining the thickness of each of the plurality of detection mark patterns. In some embodiments, the photoetching parameter adjustment apparatus may compare the thickness of each detection mark pattern with the thicknesses of all the other detection mark patterns. The photoetching parameter adjustment apparatus determines that the thicknesses of the plurality of detection mark patterns are equal when the thickness of each detection mark pattern is equal to the thicknesses of all the other detection mark patterns. The photoetching parameter adjustment apparatus determines that the thicknesses of the plurality of detection mark patterns are not equal when the thicknesses of at least two of the plurality of detection mark patterns are not equal. Exemplarily, assuming that the thicknesses of the twenty-four detection mark patterns 0111 as shown in FIG. 4 are $d_1, d_2, d_3 \ldots d_{24}$, the photoetching parameter adjustment apparatus may compare $d_1$ with each thickness among $d_2, d_3 \ldots d_{24}$, respectively. If $d_1=d_2=d_3 \ldots =d_{24}$, the photoetching parameter adjustment apparatus determines that the thicknesses of the plurality of detection mark patterns are equal. If the thicknesses of at least two detection mark patterns among $d_1, d_2, d_3 \ldots d_{24}$ (for example, $d_2$ and $d_3$) are not equal, the photoetching parameter adjustment apparatus determines that the thicknesses of the plurality of detection mark patterns are not equal.

At sub-step 30413, the thickness distribution of the photoetching detection patterns is determined to be uniform.

If the thicknesses of the plurality of detection mark patterns are determined to be equal at sub-step 30412, the photoetching parameter adjustment apparatus may determine that the thickness distribution of the photoetching detection pattern is uniform. For example, when $d_1=d_2=d_3 \ldots d_{24}$, the photoetching parameter adjustment apparatus determines that the thickness distribution of the photoetching detection pattern is uniform.

At step 30414, t the thickness distribution of the photoetching detection pattern is determined to be non-uniform.

If the thicknesses of at least two of the plurality of detection mark patterns are determined to be not equal at sub-step 30412, the photoetching parameter adjustment apparatus may determine that the thickness distribution of the photoetching detection pattern is non-uniform. For example, when $d_2$ and $d_3$ are not equal, the photoetching parameter adjustment apparatus determines that the thickness distribution of the photoetching detection pattern is non-uniform.

It should be noted that, in practice, the number of the detection mark patterns of the photoetching detection pattern is large. Since there is a certain operation error in the process of forming the detection mark patterns and there is also a certain error in the process of calculating the thicknesses of the detection mark patterns, there may be some detection mark patterns whose thicknesses are not equal to the thicknesses of the other detection mark patterns. Here, the photoetching parameter adjustment apparatus may judge whether the number of the detection mark patterns equal in thickness is greater than a preset threshold or not. The photoetching parameter adjustment apparatus determines that the thickness distribution of the photoetching detection pattern is uniform if the number of the detection mark patterns equal in thickness is greater than the preset threshold. The photoetching parameter adjustment apparatus determines that the thickness distribution of the photoetching detection pattern is non-uniform if the number of the detection mark patterns equal in thickness is not greater than the preset threshold. Alternatively, the photoetching parameter adjustment apparatus may determine the ratio of the number of the detection mark patterns equal in thickness to the total number of the detection mark patterns, and judge whether the ratio is greater than a preset ratio or not. The photoetching parameter adjustment apparatus determines that the thickness distribution of the photoetching detection pattern is uniform if the ratio is greater than the preset ratio. The photoetching parameter adjustment apparatus determine that the thickness distribution of the photoetching detection pattern is non-uniform if the ratio is not larger than the preset ratio, which will be not limited by the embodiment of the present disclosure.

At sub-step 3042, it's determined that the coating parameters of the coating process need to be adjusted.

If the thickness distribution of the photoetching detection pattern is determined to be non-uniform at sub-step 3041, the photoetching parameter adjustment apparatus determines that the coating parameters of the coating process need to be adjusted. For example, the photoetching parameter adjustment apparatus determines that the coating parameters need to be adjusted when $d_2$ and $d_3$ are not equal.

At sub-step 3043, whether the exposure parameters of the exposure process need to be adjusted or not is judged in accordance with the photoetching detection pattern.

Figure 9:
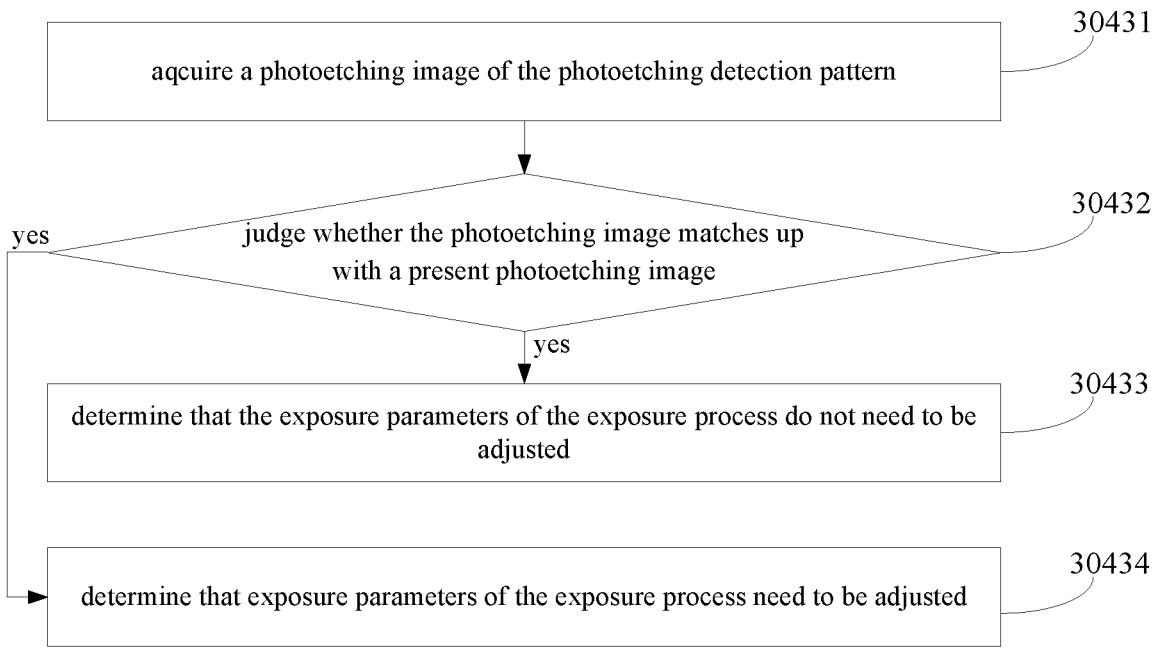
FIG. 9 is a flow chart of a method for judging whether exposure parameters need to be adjusted or not provided in an embodiment of the present disclosure.

If the thickness distribution of the photoetching detection pattern is determined to be uniform at sub-step 3041, the photoetching parameter adjustment apparatus may judge whether the exposure parameters of the exposure process need to be adjusted in accordance with the photoetching detection pattern. Exemplarily, referring to FIG. 9, which illustrates a flow chart of a method for judging whether the exposure parameters need to be adjusted or not provided in an embodiment of the present disclosure. Referring to FIG. 9, the method comprises:

At sub-step 30431, a photoetching image of the photoetching detection pattern is acquired. Then, sub-step 30432 is executed.

In the embodiment of the present disclosure, the photoetching parameter adjustment apparatus may be provided with an image acquisition component by which the photoetching parameter adjustment apparatus may acquire the photoetching image of the photoetching detection pattern. Here, the image acquisition component may be a camera by which the photoetching parameter adjustment apparatus may photograph the photoetching detection pattern to obtain the photoetching image of the photoetching detection pattern. In some embodiments, the photoetching parameter adjustment apparatus may acquire the photoetching image of the photoetching detection pattern corresponding to each exposure shot, or acquire the photoetching image of each detection mark pattern, respectively, which will not be limited by the embodiment of the present disclosure. The embodiment of the present disclosure is illustrated by taking an example in which the photoetching parameter adjustment apparatus acquires the photoetching image of each detection mark pattern.

At sub-step 30432, whether the photoetching image matches up with a present photoetching image or not is judged. Sub-step 30433 is executed when the photoetching image matches up with the preset photoetching image. Sub-step 30434 is executed when the photoetching image does not match up with the preset photoetching image.

Here, the photoetching parameter adjustment apparatus may store the preset photoetching image. The preset photoetching image may be the photoetching image of the preset photoetching detection pattern, or the photoetching image of the preset detection mark pattern. The preset photoetching detection pattern may be the preset photoetching detection pattern corresponding to one exposure shot, which will not be limited by the embodiment of the present disclosure.

In the embodiment of the present disclosure, when the preset photographing image is the photoetching image of the preset photoetching detection pattern, the photoetching parameter adjustment apparatus may, after acquiring the photoetching image of the photoetching detection pattern corresponding to each exposure shot, compare the photoetching image of the photoetching detection pattern corresponding to each exposure shot with the preset photoetching image to judge whether the photoetching image of the photoetching detection pattern matches up with the preset photoetching image or not. When the preset photoetching image is the same as the photoetching image of the preset detection mark pattern, the photoetching parameter adjustment apparatus may, after acquiring the photoetching image of each detection mark pattern, compare the photoetching image of each detection mark pattern with the preset photoetching image to judge whether the photoetching image of each detection mark pattern matches up with the preset photoetching image or not. The embodiment of the present disclosure is illustrated by taking an example in which the photoetching image of each detection mark pattern is acquired. Therefore, the preset photoetching image stored in the photoetching parameter adjustment apparatus is the same as the photoetching image of the preset detection mark pattern. The photoetching parameter adjustment apparatus judges whether the photoetching image of each photoetching detection pattern matches up with the preset photoetching image or not by comparing the photoetching image of each photoetching detection pattern with the preset photoetching image.

Figure 10:
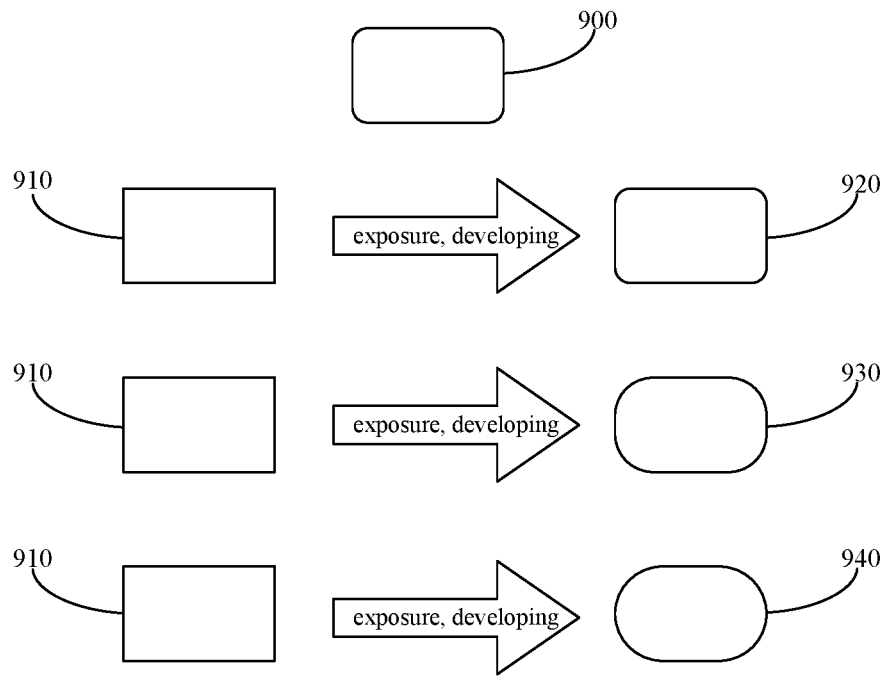
FIG. 10 is a schematic diagram of a photoetching image of a detection mark pattern provided in an embodiment of the present disclosure.

Exemplarily, as shown in FIG. 10, after the photoresist layer (not shown in FIG. 10) is exposed and developed by adopting a first mask plate (not shown in FIG. 10), the detection pattern (not shown in FIG. 10) on the first mask plate is transferred to the photoresist layer (not shown in FIG. 10), to form a photoetching detection pattern (not shown in FIG. 10) on the photoresist layer. In addition, a detection mark pattern 910 of the detection pattern on the first mask plate corresponds to the detection mark pattern of the photoetching detection pattern. Exemplarily, it is assumed in the embodiment of the present disclosure that the detection mark pattern obtained through exposure and development is a detection mark pattern 920, then the photoetching parameter adjustment apparatus may acquire the photoetching image of the detection mark pattern 920 and judge whether the photoetching image of the detection mark pattern 920 matches up with a preset photoetching image 900 or not by comparing the photoetching image of the detection mark pattern 920 with the preset photoetching image 900. As known from FIG. 10, the photoetching image of the detection mark pattern 920 is the same as the preset photoetching image 900. Therefore, the photoetching image of the detection mark pattern 920 matches up with the preset photoetching image 900. For another example, assuming in the embodiment of the present disclosure that the detection mark pattern obtained through exposure and development is a detection mark pattern 930, the photoetching parameter adjustment apparatus may acquire the photoetching image of the detection mark pattern 930 and then judge whether the photoetching image of the detection mark pattern 930 matches up with the preset photoetching image 900 or not by comparing the photoetching image of the detection mark pattern 930 with the preset photoetching image 900. As known from FIG. 10, the photoetching image of the detection mark pattern 930 is not the same as the preset photoetching image 900. Therefore, the photoetching image of the detection mark pattern 930 does not match up with the preset photoetching image 900. For a further example, assuming in the embodiment of the present disclosure that the detection mark pattern obtained through exposure and development is a detection mark pattern 940, the photoetching parameter adjustment apparatus may acquire the photoetching image of the detection mark pattern 940 and then judge whether the photoetching image of the detection mark pattern 940 matches up with the preset photoetching image 900 or not by comparing the photoetching image of the detection mark pattern 940 with the preset photoetching image 900. As known from FIG. 10, the photoetching image of the detection mark pattern 940 is not the same as the preset photoetching image 900. Therefore, the photoetching image of the detection mark pattern 940 does not match up with the preset photoetching image 900. As known from FIG. 10, both the detection mark pattern 930 and the detection mark pattern 940 are not the same as the preset photoetching image 900. In addition, compared with the preset photoetching image 900, the detection mark pattern 940 has a large deformation, while the detection mark pattern 930 has a small deformation. Therefore, it may be determined that the exposure amount (or exposure speed) corresponding to the detection mark pattern 940 and the exposure amount (or exposure speed) corresponding to the detection mark pattern 930 are large, and the exposure amount (or exposure speed) corresponding to the detection mark pattern 940 is larger than the exposure amount (or exposure speed) corresponding to the detection mark pattern 930, and thus the exposure amount (or exposure speed) needs to be adjusted.

In some embodiments, the photoetching parameter adjustment apparatus may judge whether the exposure focus needs to be adjusted by comparing the photoetching images of the photoetching detection patterns corresponding to different exposure shots. If the photoetching image of the photoetching detection pattern corresponding to any exposure shot is different from the photoetching images of the photoetching detection patterns corresponding to the other exposure shots, the photoetching parameter adjustment apparatus determines that the exposure focus needs to be adjusted. If the photoetching images of the photoetching detection patterns corresponding to all of the exposure shots are the same, the photoetching parameter adjustment apparatus determines that the exposure focus does not need to be adjusted.

Exemplarily, the photoetching parameter adjustment apparatus may compare the photoetching image of the photoetching detection pattern corresponding to the first exposure shot with the photoetching image of the photoetching detection pattern corresponding to the second exposure shot, with the photoetching image of the photoetching detection pattern corresponding to the third exposure shot and with the photoetching image of the photoetching detection pattern corresponding to the fourth exposure shot, respectively. If the photoetching image of the photoetching detection pattern corresponding to the first exposure shot is the same as both the photoetching image of the photoetching detection pattern corresponding to the second exposure shot and the photoetching image of the photoetching detection pattern corresponding to the fourth exposure shot, but not the same as the photoetching image of the photoetching detection pattern corresponding to the third exposure shot, the photoetching parameter adjustment apparatus determines that the exposure focus needs to be adjusted. It should be noted that the photoetching parameter adjustment apparatus may acquire the photoetching images of the detection mark patterns of the photoetching detection patterns corresponding to different exposure shots by comparing the photoetching images of the photoetching detection patterns corresponding to different exposure shots, and judge whether the photoetching images of the detection mark patterns are the same or not. For example, assuming that the detection mark pattern 920 is the detection mark pattern corresponding to the first exposure shot and the detection mark pattern 930 is the detection mark pattern corresponding to the second exposure shot, the photoetching parameter adjustment apparatus may judge whether the photoetching image of the detection mark pattern 920 is the same as the photoetching image of the detection mark pattern 930 or not.

It should be noted that the detection mark pattern 910 shown in FIG. 10 is exemplary only. In the practice, the structure of the detection mark pattern 910 may be the same as that of the detection mark pattern 0021 in the embodiment shown in FIG. 1, which will not be limited by the embodiment of the present disclosure.

At sub-step 30433, it is determined that the exposure parameters of the exposure process do not need to be adjusted.

If the photoetching image is determined to match up with the preset photoetching image at sub-step 30432, the photoetching parameter adjustment apparatus determines that the exposure parameters of the exposure process do not need to be adjusted.

At sub-step 30434, it's determined that exposure parameters of the exposure process need to be adjusted.

If the photoetching image is determined not to match up with the preset photoetching image at sub-step 30432, the photoetching parameter adjustment apparatus determines that the exposure parameters of the exposure process need to be adjusted.

At step 305, the photoetching parameters are adjusted.

The photoetching parameter adjustment apparatus adjusts the photoetching parameters if it determines that the photoetching parameters need to be adjusted at step 304 above. Here, the photoetching parameter adjustment apparatus may be connected to the photoetching equipment and may control the photoetching equipment to adjust the photoetching parameters. The photoetching equipment may be coating equipment, exposure equipment or the like. Alternatively, the photoetching parameter adjustment apparatus may make a prompting sound to prompt the working staff to adjust the photoetching parameters, which will not be limited by the embodiment of the present disclosure.

Exemplarily, the photoetching parameter adjustment apparatus controls the coating equipment to adjust the coating parameters if it determines that the coating parameters need to be adjusted at step 304. The photoetching parameter adjustment apparatus controls the exposure equipment to adjust at least one of the exposure parameters of, such as the exposure amount, the exposure speed and the exposure focus if it determines that the exposure parameters need to be adjusted at step 304. The implementation process of adjusting the photoetching parameters may be referenced to the related art and will not be repeated in the embodiment of the present disclosure.

At step 306, the photoetching parameters are not adjusted.

The photoetching parameter adjustment apparatus does not adjust the photoetching parameters, if it determines that the photoetching parameters do not need to be adjusted at step 304.

In summary, with the photoetching parameter adjustment method provided in the embodiments of the present disclosure, whether the photoetching parameters need to be adjusted or not may be judged in accordance with the photoetching detection pattern in the process of manufacturing the substrate, and the photoetching parameters are adjusted in accordance with the judgment result. Therefore, the photoetching parameters may be adjusted in time, thereby solving the problem that the reliability of photoetching parameters is low since it is difficult to adjust the photoetching parameters in time in accordance with actual requirements in the related art, and improving the reliability of the photoetching parameters.

In the related art, generally, the photoetching parameters may only be adjusted during the PM or verification test, and may not be monitored and adjusted in real time. Therefore, it is difficult to guarantee the uniformity in coating, exposure and the like. In addition, in the related art, the corresponding photoetching parameters are adjusted after the uniformity of each part is tested (For example, the uniformity of the photoresist is tested and then the coating parameters are adjusted). Therefore, the uniformity in coating and exposure may not be reflected finally (i.e., the uniformity in coating and the uniformity in exposure may not be guaranteed at the same time).

The photoetching parameter adjustment method provided in the embodiments of the present disclosure is that the capacitance of the photoetching detection pattern is measured through a contact method or a non-contact method to further determine the thickness of the photoetching detection pattern in accordance with the capacitance of the photoetching detection pattern and to judge whether the thickness distribution of the photoetching detection pattern is uniform or not. In addition, in the embodiments of the present disclosure, the photoetching image of the photoetching detection pattern may also be acquired, and whether the exposure is uniform or not is judged in accordance with the photoetching image of the photoetching detection pattern. Therefore, the uniformity in the photoresist thickness and the uniformity in exposure may be monitored in real time in the process of manufacturing the substrate and the photoetching parameters may be adjusted in real time. Additionally, the problem that the coating or the exposure is non-uniform may be warned in time, thereby guaranteeing the uniformity in coating, exposure and the like, and improving the stability of the photoetching process. Further, in the embodiments of the present disclosure, the photoetching parameters are adjusted after coating, exposure and development. Thus, the uniformity in coating and the uniformity in exposure may be reflected finally (i.e., the uniformity in coating and the uniformity in exposure may be guaranteed at the same time).

In the embodiments of the present disclosure, the detection pattern is disposed outside the mask pattern and the photoetching detection pattern is formed on the substrate through the photoetching process. The photoetching detection pattern is tested electrically in the contact method or non-contact method and the photoetching image of the photoetching detection pattern is acquired after the test is ended, thereby achieving the technical effect of monitoring the photoetching uniformity in real time.

The following is an apparatus in the embodiments of the present disclosure, which may be used to implement the method in the embodiments of the present disclosure. The details that are not disclosed in the apparatus of the embodiments of the present disclosure may be referenced to the method of the embodiments of the present disclosure.

Figure 11:
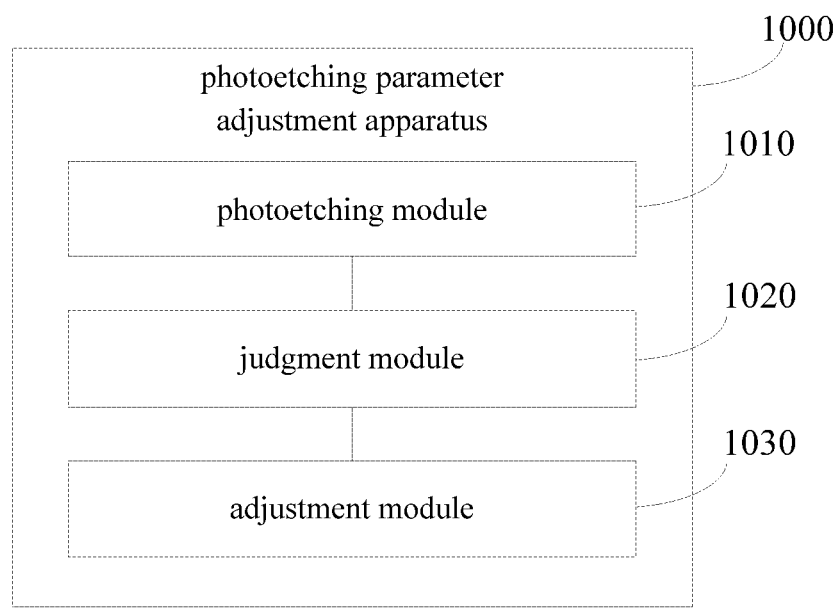
FIG. 11 is a block diagram of a photoetching parameter adjustment apparatus provided in an embodiment of the present disclosure.

FIG. 11 illustrates a block diagram of a photoetching parameter adjustment apparatus 1000 provided in an embodiment of the present disclosure. The photoetching parameter adjustment apparatus 1000 may be used to implement the photoetching parameter adjustment method provided in the embodiment as shown in FIG. 2 or 3. Referring to FIG. 11, the photoetching parameter adjustment apparatus 1000 may include, but are not limited to:

a photoetching module 1010 configured to form a photoresist pattern on a first substrate through a photoetching process, wherein the photoresist pattern comprises a photoetching detection pattern;

a judgment module 1020 configured to judge whether the photoetching parameters of the photoetching process need to be adjusted or not in accordance with the photoetching detection pattern; and an adjustment module 1030 configured to adjust the photoetching parameters when the photoetching parameters need to be adjusted.

In summary, by adopting the photoetching parameter adjustment apparatus provided in the embodiment of the present disclosure, whether the photoetching parameters need to be adjusted or not may be judged in accordance with the photoetching detection pattern in the process of manufacturing the substrate, and the photoetching parameters are adjusted in accordance with the judgment result. Therefore, the photoetching parameters may be adjusted in time, thereby solving the problem that the reliability of photoetching parameters is low since it is difficult to adjust the photoetching parameters in time in accordance with actual requirements in the related art, and improving the reliability of the photoetching parameters.

Figure 12:
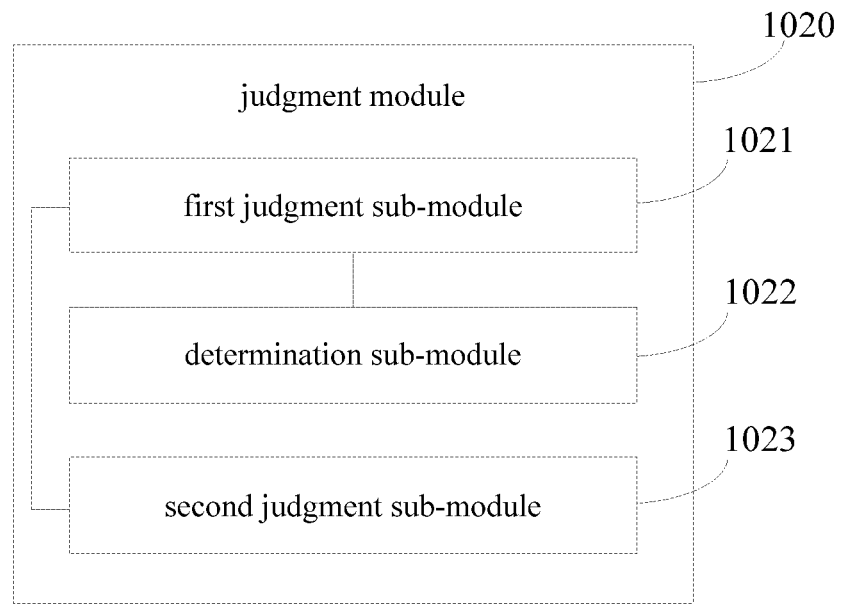
FIG. 12 is a block diagram of a judgment module provided in an embodiment of the present disclosure.

In some embodiments, the photoetching process comprises a coating process and an exposure process, and the photoetching parameters comprise coating parameters and exposure parameters. Referring to FIG. 12, which illustrates a block diagram of the judgment module 1020 provided in an embodiment of the present disclosure. Referring to FIG. 12, the judgment module 1020 comprises:

a first judgment sub-module 1021 configured to judge whether the thickness distribution of the photoetching detection pattern is uniform or not;

a determination sub-module 1022 configured to determine that the coating parameters of the coating process need to be adjusted when the thickness distribution of the photoetching detection pattern is non-uniform; and a second judgment sub-module 1023 configured to judge whether the exposure parameters of the exposure process need to be adjusted or not in accordance with the photoetching detection pattern when the thickness distribution of the photoetching detection pattern is uniform.

Figure 13:
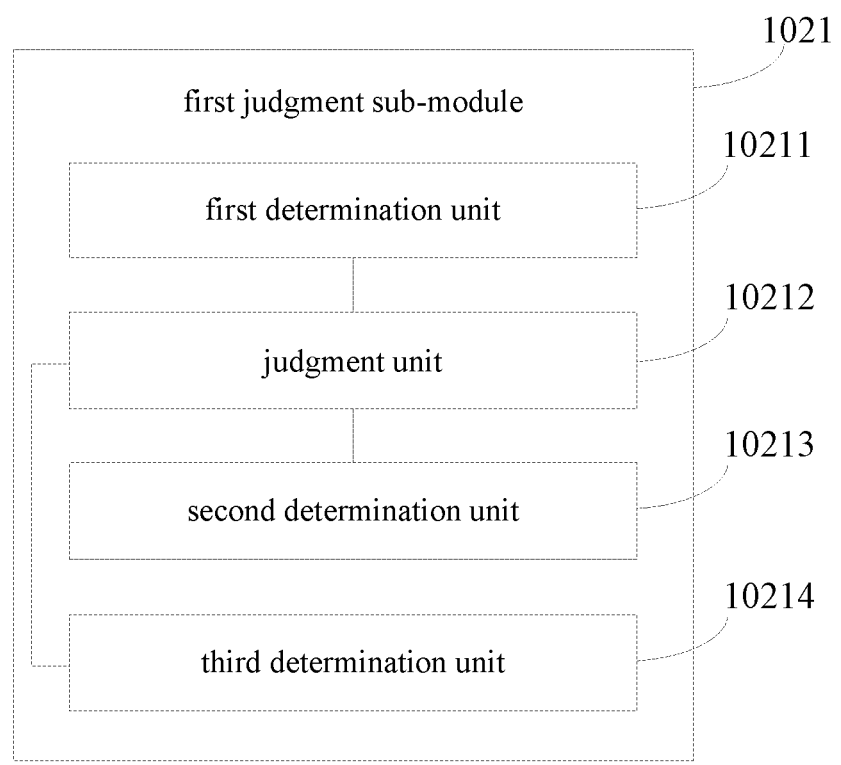
FIG. 13 is a block diagram of a first judgment sub-module provided in an embodiment of the present disclosure.

In some embodiments, the photoetching detection pattern comprises a plurality of detection mark patterns. Referring to FIG. 13, which illustrates a block diagram of the first judgment sub-module 1021 provided in an embodiment of the present disclosure. Referring to FIG. 13, the first judgment sub-module 1021 comprises:

a first determination unit 10211 configured to determine the thickness of each of the plurality of detection mark patterns;

a judgment unit 10212 configured to judge whether the thicknesses of the plurality of detection mark patterns are equal or not;

a second determination unit 10213 configured to determine that the thickness distribution of the photoetching detection pattern is uniform when the thicknesses of the plurality of detection mark patterns are equal; and a third determination unit 10214 configured to determine that the thickness distribution of the photoetching detection pattern is non-uniform when the thicknesses of at least two of the plurality of detection mark patterns are not equal.

In some embodiments, the first determination unit 10211 is configured to:

determine the capacitance corresponding to the first detection mark pattern, wherein the first detection mark pattern is any of the plurality of detection mark patterns; and determine the thickness of the first detection mark pattern in accordance with the thickness determination formula, wherein the thickness determination formula is:

$$d = \varepsilon \frac{S}{C_n}, \quad \frac{1}{C_n} = \frac{1}{C} - \left(\frac{1}{C_1} + \frac{1}{C_2} \cdots \frac{1}{C_{n-1}}\right);$$

wherein, $C_n$ represents the capacitance corresponding to the first detection mark pattern; n represents that the first detection mark pattern is located on an $n^{th}$ layer of the first substrate; S represents an area of a directly opposite portion between a side of the first detection mark pattern close to the first substrate and a side of the first detection mark pattern away from the first substrate; d represents the thickness of the first detection mark pattern; C represents the total capacitance of corresponding areas of the first detection mark pattern on n-layer patterns of the first substrate; $C_1$ represents the capacitance of the corresponding area of the first detection mark pattern on a first layer pattern of the first substrate, $C_2$ represents the capacitance of the corresponding area of the first detection mark pattern on a second layer pattern of the first substrate, $C_{n-1}$ represents the capacitance of the corresponding area of the first detection mark pattern on an $(n-1)^{th}$ layer pattern of the first substrate. That is, $C_1$ represents the capacitance corresponding to a first pattern, the first pattern belongs to the first layer pattern of the first substrate and is located within an area formed by an orthographic projection of a profile of the first detection mark pattern on the first layer pattern, $C_2$ represents the capacitance corresponding to a second pattern, the second pattern belongs to a second layer pattern of the first substrate and is located within the area formed by the orthographic projection of the profile of the first detection mark pattern on the second layer pattern, $C_{n-1}$ represents the capacitance corresponding to an $(n-1)^{th}$ pattern, the $(n-1)^{th}$ pattern belongs to an $(n-1)^{th}$ layer pattern of the first substrate and is located within the area formed by the orthographic projection of the profile of the first detection mark pattern on the $(n-1)^{th}$ layer pattern; C represents the capacitance corresponding to a structure formed by superposing the first pattern until to the first detection mark pattern, and $\varepsilon$ represents a dielectric constant.

In some embodiments, the second judgment sub-module 1023 is configured to:

acquire a photoetching image of the photoetching detection pattern;

judge whether the photoetching image matches up with a present photoetching image or not;

determine that the exposure parameters of the exposure process do not need to be adjusted when the photoetching image matches up with the preset photoetching image; and determine that the exposure parameters of the exposure process need to be adjusted when the photoetching image does not match up with the preset photoetching image.

In some embodiments, the photoresist pattern further includes a photoetching mask pattern which is located in the display area of the first substrate. A photoetching module 1010 is configured to:

form a photoresist layer on the first substrate through a coating process;

expose the photoresist layer by adopting a first mask plate through an exposure process; and develop the exposed photoresist layer through a developing process to obtain the photoresist pattern;

wherein, the first mask plate comprises a mask pattern area and a detection pattern area. The mask pattern area is provided with a mask pattern and the detection pattern area is provided with a detection pattern. The photoetching mask pattern corresponds to the mask pattern, and the photoetching detection pattern corresponds to the detection pattern.

In some embodiments, the first substrate is provided with a display area and a non-display area, and the photoetching detection pattern is located in the non-display area of the first substrate.

In summary, by adopting the photoetching parameter adjustment apparatus provided in the embodiments of the present disclosure, whether the photoetching parameters need to be adjusted or not may be judged in accordance with the photoetching detection pattern in the process of manufacturing the substrate, and the photoetching parameters are adjusted in accordance with the judgment result. Therefore, the photoetching parameters may be adjusted in time, thereby solving the problem that the reliability of photoetching parameters is low since it is difficult to adjust the photoetching parameters in time in accordance with actual requirements in the related art, and improving the reliability of the photoetching parameters.

It should be noted that the photoetching parameter adjustment apparatus provided in the embodiments described above is exemplified only by the division of each of the functional modules described above when adjusting the photoetching parameters. In practice, the above-described functions may be assigned and completed by different functional modules in accordance with requirements, such that the internal structure of the apparatus can be divided into different functional modules to complete all or part of the functions described above. In addition, the photoetching parameter adjustment apparatus and the method provided in the above embodiments follow the same concept, and the implementation process thereof is described in details with reference to the method embodiment, and will not be repeated herein.

Those skilled in the art may understand that all or part of the steps in the above embodiments may be completed by hardware, or by relevant hardware executed by programs. The described programs may be stored in a computer readable storage medium, which may be a read only memory, a magnetic disk or a CD.

The foregoing are only some embodiments of the present disclosure, and are not intended to limit the present disclosure. Within the spirit and principles of the disclosure, any modifications, equivalent substitutions, improvements, etc., are within the scope of protection of the present disclosure.

What is claimed is:

1. A photoetching parameter adjustment method, comprising:
   forming a photoresist pattern on a first substrate through a photoetching process, wherein the photoresist pattern comprises a photoetching detection pattern, the photoetching detection pattern comprises a plurality of detection mark patterns, and the photoetching process comprises a coating process and an exposure process;
   judging whether a thickness distribution of the photoetching detection pattern is uniform or not;
   determining that the coating parameters of the coating process need to be adjusted under the condition that the thickness distribution of the photoetching detection pattern is non-uniform; and
   judging whether the exposure parameters of the exposure process need to be adjusted or not in accordance with the photoetching detection pattern under the condition that the thickness distribution of the photoetching detection pattern is uniform; and
   adjusting photoetching parameters under the condition that the photoetching parameters need to be adjusted, wherein the photoetching parameters comprise coating parameters and exposure parameters; and
   wherein, the thickness distribution of the photoetching detection pattern is determined to be uniform, if the number of the detection mark patterns equal in thickness is greater than the preset threshold; and the thickness distribution of the photoetching detection pattern is determined to be non-uniform, if the number of the detection mark patterns equal in thickness is not greater than the preset threshold.

2. The method of claim 1, wherein judging whether the thickness distribution of the photoetching detection pattern is uniform or not comprises:
   determining a thickness of each of the plurality of detection mark patterns;
   judging whether the thicknesses of the plurality of detection mark patterns are equal or not;
   determining that the thickness distribution of the photoetching detection pattern is uniform under the condition that the thicknesses of the plurality of detection mark patterns are equal; and
   determining that the thickness distribution of the photoetching detection pattern is non-uniform under the condition that the thicknesses of at least two of the plurality of detection mark patterns are not equal.

3. The method of claim 2, wherein determining the thickness of each of the plurality of detection mark patterns comprises:
   determining the capacitance corresponding to a first detection mark pattern, wherein the first detection pattern is any of the plurality of detection mark patterns; and
   determining the thickness of the first detection mark pattern in accordance with a thickness determination formula, wherein the thickness determination formula is:

$$d = \varepsilon \frac{S}{C_n}, \frac{1}{C_n} = \frac{1}{C} - \left(\frac{1}{C_1} + \frac{1}{C_2} \cdots \frac{1}{C_{n-1}}\right);$$

wherein, $C_n$ represents the capacitance corresponding to the first detection mark pattern, n represents that the first detection mark pattern is located on an $n^{th}$ layer of the first substrate, S represents an area of a directly opposite portion between a side of the first detection mark pattern close to the first substrate and a side of the first detection mark pattern away from the first substrate, d represents the thickness of the first detection mark pattern, $C_1$ represents the capacitance corresponding to a first pattern, the first pattern belongs to a first layer pattern of the first substrate and is located within an area formed by an orthographic projection of a profile of the first detection mark pattern on the first layer pattern, $C_2$ represents the capacitance corresponding to a second pattern, the second pattern belongs to a second layer pattern of the first substrate and is located within an area formed by the orthographic projection of the profile of the first detection mark pattern on the second layer pattern, $C_{n-1}$ represents the capacitance corresponding to an $(n-1)^{th}$ pattern, the $(n-1)^{th}$ pattern belongs to an $(n-1)^{th}$ layer pattern of the first substrate and is located within the area formed by the orthographic projection of the profile of the first detection mark pattern on the $(n-1)^{th}$ layer pattern, C represents the capacitance corresponding to a structure formed by superposing the first pattern until to the first detection mark pattern, and $\varepsilon$ represents a dielectric constant.

4. The method of claim 1, wherein judging whether the exposure parameters of the exposure process need to be adjusted or not in accordance with the photoetching detection pattern comprises:

acquiring a photoetching image of the photoetching detection pattern;

judging whether the photoetching image matches up with a preset photoetching image or not;

determining that the exposure parameters of the exposure process do not need to be adjusted under the condition that the photoetching image matches up with the preset photoetching image; and determining that the exposure parameters of the exposure process need to be adjusted under the condition that the photoetching image does not match up with the preset photoetching image.

5. The method of claim 1, wherein the photoresist pattern further comprises a photoetching mask pattern that is located in a display area of the first substrate, and forming the photoresist pattern on the first substrate through the photoetching process comprises:

forming a photoresist layer on the first substrate through a coating process;

exposing the photoresist layer by adopting a first mask plate through an exposure process; and developing the exposed photoresist layer through a developing process to obtain the photoresist pattern;

wherein, the first mask plate comprises: a mask pattern area and a detection pattern area; the mask pattern area is provided with a mask pattern, and the detection pattern area is provided with a detection pattern; the photoetching mask pattern corresponds to the mask pattern, and the photoetching detection pattern corresponds to the detection pattern.

6. The method of claim 1, wherein the first substrate is provided with a display area and a non-display area, and the photoetching detection pattern is located in the non-display area of the first substrate.

* * * * *